United States Patent
Takahashi

(10) Patent No.: US 7,435,026 B2
(45) Date of Patent: Oct. 14, 2008

(54) TAPE PRINTING APPARATUS, TAPE PRINTING APPARATUS CHARGER AND TAPE PRINTING APPARATUS CHARGING SYSTEM

(75) Inventor: Toshihiro Takahashi, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 11/600,726

(22) Filed: Nov. 17, 2006

(65) Prior Publication Data

US 2007/0065221 A1    Mar. 22, 2007

Related U.S. Application Data

(62) Division of application No. 10/927,144, filed on Aug. 27, 2004, now Pat. No. 7,153,051.

(30) Foreign Application Priority Data

Sep. 24, 2003    (JP)    ............................. 2003-330850

(51) Int. Cl.
*B41J 3/39*    (2006.01)
(52) U.S. Cl. ........................................ 400/691; 400/88
(58) Field of Classification Search ................. 400/691, 400/88
See application file for complete search history.

(56) References Cited

U.S. PATENT DOCUMENTS

| | | | |
|---|---|---|---|
| 5,144,217 A | 9/1992 | Gardner et al. | |
| 5,186,558 A | 2/1993 | Sherman et al. | |
| 5,209,583 A | 5/1993 | Lewis et al. | |
| 5,256,955 A | 10/1993 | Tomura et al. | |
| 5,331,580 A | 7/1994 | Miller et al. | |
| 5,533,818 A * | 7/1996 | Bahrabadi | 400/208 |
| 5,602,454 A | 2/1997 | Arakawa et al. | |
| 5,629,615 A * | 5/1997 | Nita et al. | 324/121 R |
| 6,012,860 A * | 1/2000 | Nunokawa et al. | 400/3 |
| 6,075,341 A | 6/2000 | White et al. | |
| 6,230,860 B1 | 5/2001 | Wu | |
| 6,347,897 B2 * | 2/2002 | Huggins et al. | 400/621 |
| 6,382,761 B1 * | 5/2002 | Asano et al. | 347/19 |
| 6,583,600 B2 | 6/2003 | Haga et al. | |

(Continued)

FOREIGN PATENT DOCUMENTS

JP    A-64-60232    3/1989

(Continued)

*Primary Examiner*—Anthony H. Nguyen
(74) *Attorney, Agent, or Firm*—Oliff & Berridge, PLC

(57) ABSTRACT

A tape printing apparatus that can be set smoothly into a tape printing apparatus charger from a free angle by gripping the top face section and the bottom face section of the tape printing apparatus such that the front side face section faces downward and the right side face section faces the forward direction, the lower edge on the right side face section of the tape printing apparatus is placed on the forward section of the fitting section from an angle obliquely upward of the tape printing apparatus charger. With the front side face section of the tape printing apparatus kept in contact with the top edge on the front side wall section of the fitting section of the tape printing apparatus charger, the tape printing apparatus is inserted into the tape printing apparatus charger in the forward direction for recharging.

10 Claims, 15 Drawing Sheets

U.S. PATENT DOCUMENTS

| | | |
|---|---|---|
| 6,610,941 B2 | 8/2003 | Pfeiffer |
| 6,776,542 B1 | 8/2004 | Kearney |
| 2002/0057021 A1 | 5/2002 | Tanaka et al. |
| 2002/0186293 A1 | 12/2002 | Ando |
| 2003/0160590 A1* | 8/2003 | Schaefer et al. ............. 320/107 |

FOREIGN PATENT DOCUMENTS

| | | |
|---|---|---|
| JP | A-7-296859 | 11/1995 |
| JP | A-2003-72107 | 3/2003 |

\* cited by examiner

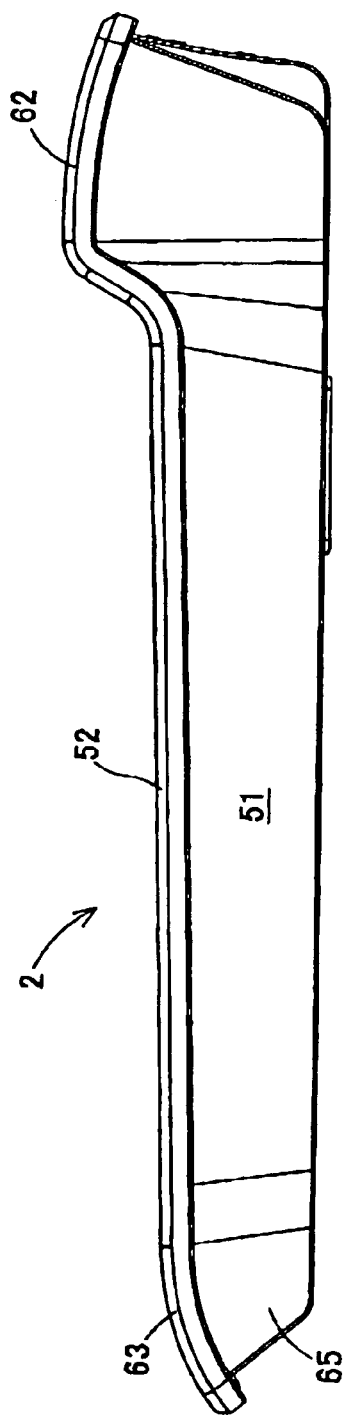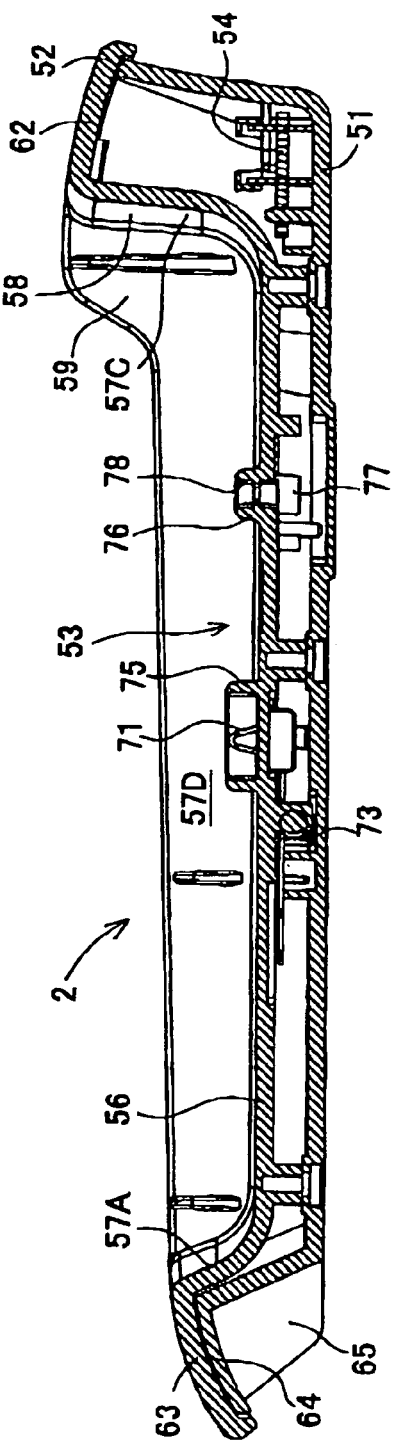

TAPE PRINTING APPARATUS, TAPE PRINTING APPARATUS CHARGER AND TAPE PRINTING APPARATUS CHARGING SYSTEM

This is a Division of application Ser. No. 10/927,144 filed Aug. 27, 2004. The disclosure of the prior application is hereby incorporated by reference herein in its entirety.

This application claims priority from JP 2003-330850 filed on Sep. 24, 2003, the disclosure of which is incorporated in its entirety herein by reference thereto.

BACKGROUND OF THE INVENTION

1. Field of Invention

The invention relates to a chargeable tape printing apparatus, a tape printing apparatus charger and a tape printing apparatus charging system using the tape printing apparatus and the tape printing apparatus charger.

2. Description of Related Art

Conventionally, many kinds of chargeable electronic apparatuses and chargers have been proposed.

For example, Japanese Patent Application Laid-Open No. SHO64-60232 discloses a charger for an electronic apparatus comprising a case and a rectifier provided within the case. A fitting section is formed in the case so that an electronic apparatus may be mounted therein. A pair of charging contact pieces, which are movably supported in the insertion direction of the electronic apparatus, are disposed on the bottom of an insertion concave section thereby enabling the charging contact pieces to make contact with a pair of charging terminals of the electronic apparatus. An elastic member is provided to urge the charging contact pieces to the insertion concave section. The contact pieces are connected to an output of a rectifying section to constitute a switch when in contact with the charging contact pieces. The charging contact pieces are retracted when the electronic apparatus is inserted into the insertion concave section.

With such a structure, when the electronic apparatus is inserted into the insertion concave section, the charging terminal of the electronic apparatus is brought into a contact with the charging contact pieces and by retracting the charging contact pieces against elasticity of the elastic member, the charging contact pieces are brought into contact with the contact pieces connected to the output of the rectifying section. Consequently, the rectifying section can be connected to the charging terminals of the electronic apparatus through a switch constituted of the contact pieces and charging contact pieces. When the electronic apparatus is removed from the insertion concave section, the charging contact pieces are separated from the contact pieces thereby interrupting power to the rectifying section.

SUMMARY OF THE INVENTION

According to an aspect of the invention, there is provided a tape printing apparatus charging system comprising a tape printing apparatus and a tape printing apparatus charger.

In the tape printing apparatus charging system of the invention, a fitting section of the tape printing apparatus charger is so constructed that a bottom face section and a first supporting section are formed in substantially an elongated rectangle, which is of substantially the same shape as a second side face section of the tape printing apparatus. Additionally, a case of the tape printing apparatus charger is also formed in a substantially elongated rectangle shape of substantially the same size as the first supporting section.

Thus, this tape printing apparatus charging system allows the tape printing apparatus to be charged when the tape printing apparatus is stood on the tape printing apparatus charger with the second side face section of the tape printing apparatus facing downward. Consequently, the tape printing apparatus charger may be placed in a small space on a desk top to recharge the tape printing apparatus, thereby saving space for the tape printing apparatus charging system.

Further, because the key input unit and display unit of the tape printing apparatus are exposed above the tape printing apparatus charger, key input, editing functions, and the like, are enabled when the tape printing apparatus is stood thereon. Further, because the tape discharge slot of the tape printing apparatus is provided in the first side face section perpendicular to the second side face section, printing of a tape is enabled with the tape printing apparatus loaded on the tape printing apparatus charger.

Because the first supporting section of the tape printing apparatus charger in the tape printing apparatus charging system is formed to a predetermined height from four sides of the bottom face section in the fitting section for supporting the vicinity section of the second side face section of the tape printing apparatus, the depth of the fitting section can be decreased and the height of the tape printing apparatus charger can be reduced.

Because the tape printing apparatus can be mounted by inserting a section inside a predetermined distance from each side of the top face section and outside of the key input unit and display unit, the tape printing apparatus can be set to the tape printing apparatus charger smoothly from a free angle, such as from obliquely upward, or forward direction. Further, when mounting or removing the tape printing apparatus on/from the tape printing apparatus charger, the tape printing apparatus can be mounted or removed on/from the tape printing apparatus charger easily by gripping the top face section and bottom face section and sliding the pieces in the appropriate direction.

Further, if the tape printing apparatus is loaded from the forward direction with the second supporting section and third supporting section of the tape printing apparatus charger located on the deep side, the third side face section of the tape printing apparatus and the top face section and bottom face section in the vicinity of the third side face section are supported by the second supporting section and third supporting section. Consequently, the tape printing apparatus is supported stably and can be set in the tape printing apparatus charger from a free angle, such as from obliquely upward, forward direction. Additionally, because the charging power supply terminals of the tape printing apparatus charger are provided at a predetermined position in the bottom face section of the fitting section and the charging power receiving terminals of the tape printing apparatus are provided on the second side face section, the tape printing apparatus can be mounted securely in the fitting section of the tape printing apparatus charger to ensure complete charging.

BRIEF DESCRIPTION OF THE DRAWINGS

The objects, features and advantages of the invention will become more apparent from reading the following description of exemplary embodiments taken in connection with the accompanying drawings in which:

FIG. 8A is a right side view showing the structure of the tape printing apparatus charger which constitutes the charging system of the embodiment;

FIG. 8B is a side sectional view showing the structure of the tape printing apparatus charger which constitutes the charging system of the embodiment;

DETAILED DESCRIPTION OF PREFERRED EMBODIMENTS

An exemplary embodiment of the tape printing apparatus, tape printing apparatus charger and charging system using the tape printing apparatus and the tape printing apparatus charger of the invention will be described in detail with reference to the accompanying drawings.

According to one aspect of the invention, there is provided a tape printing apparatus, which has a substantially thin, box shape, comprising a key input unit having a plurality of input keys and a display unit disposed on a top face section, a tape discharge slot that discharges a tape on which characters input or edited with the key input unit, or the like, are printed is provided on a first side face section. A second side face section, perpendicular to the first side face section, is provided with a charging power receiving terminal. The key input unit and display unit are disposed at least within a section at a predetermined distance from each side of a top face section connected to the first side face section. A third side face section that opposes the first side face section and the second side face section, and a section thereof outside of the key input unit and display unit is inserted and loaded on the fitting section of the tape printing apparatus charger with the second side face section facing down and recharged in the mounted condition.

Figure 1:
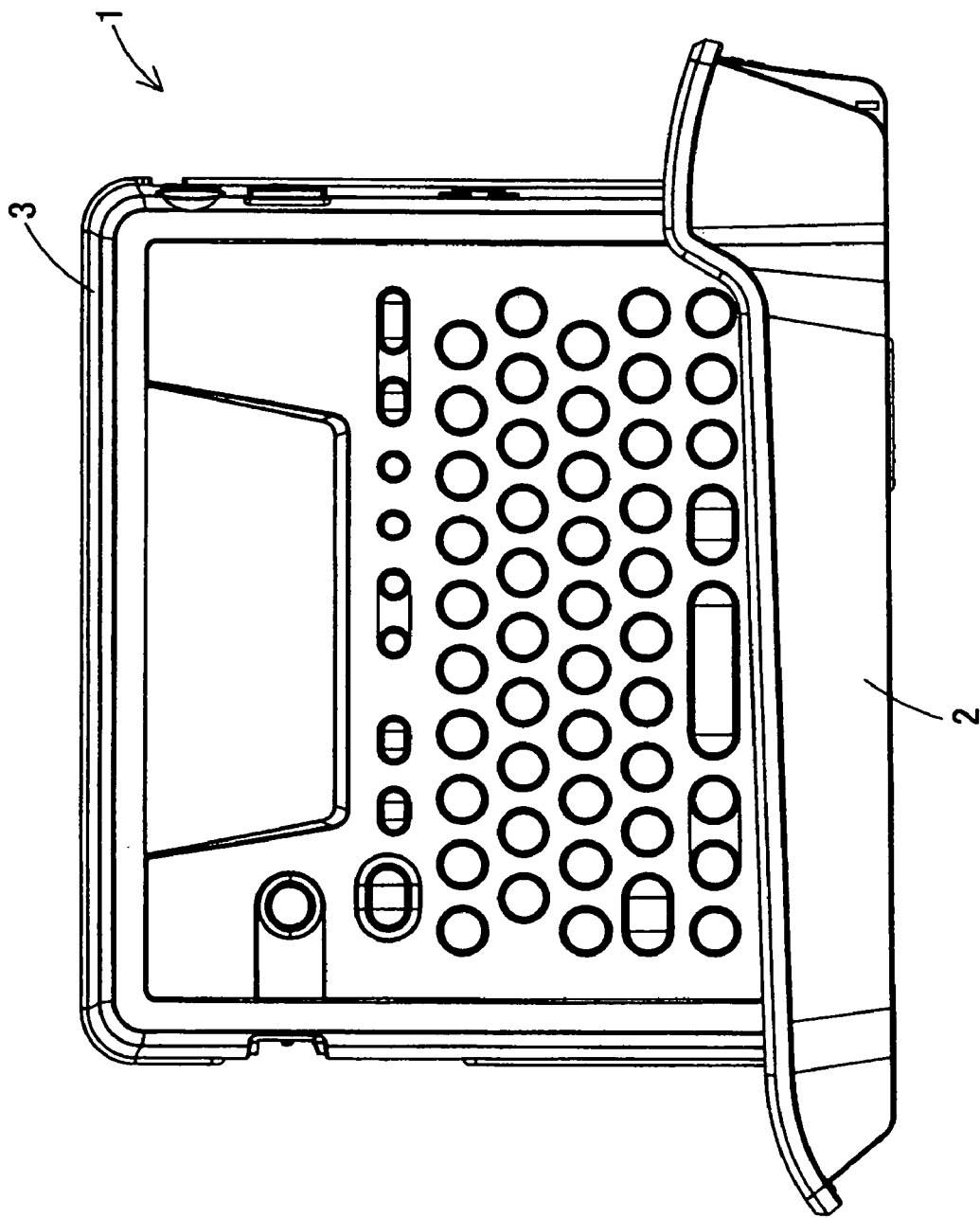
FIG. 1 is a front view showing the charging system according to an exemplary embodiment of the invention.
Figure 2:
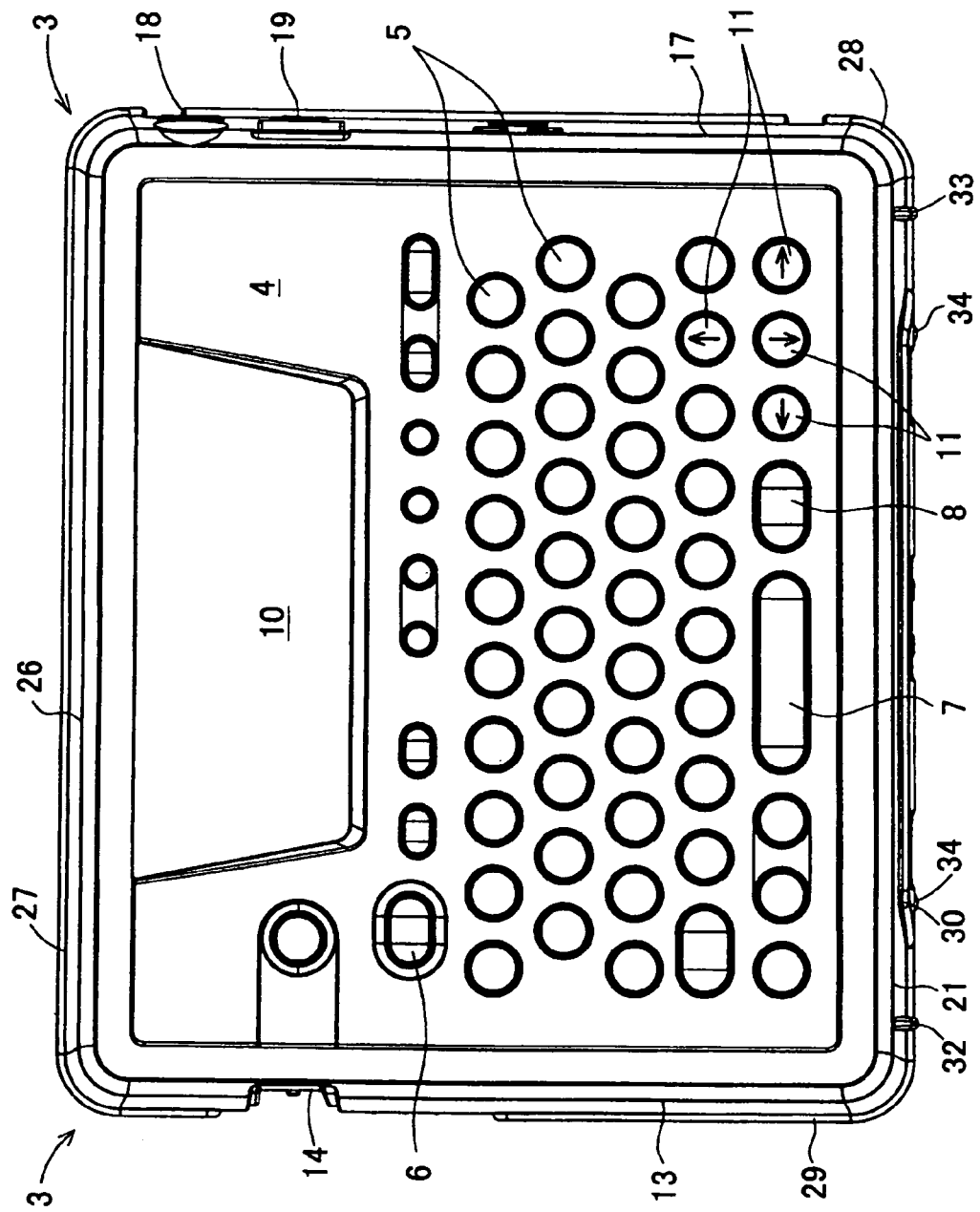
FIG. 2 is a top view representation of the tape printing apparatus which constitutes the charging system of the embodiment.
Figure 3:
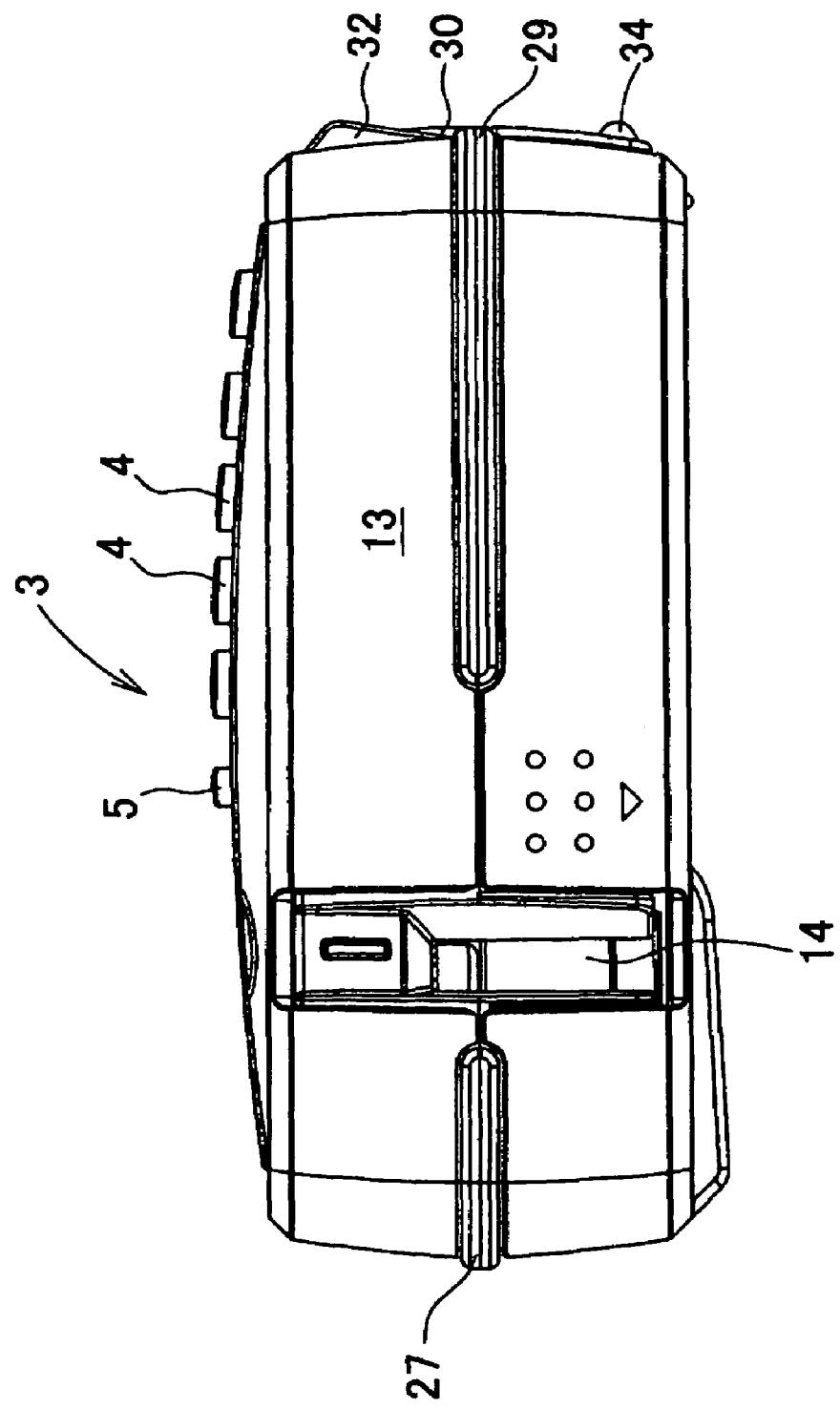
FIG. 3 is a left side representation of the tape printing apparatus which constitutes the charging system of the embodiment.
Figure 4:
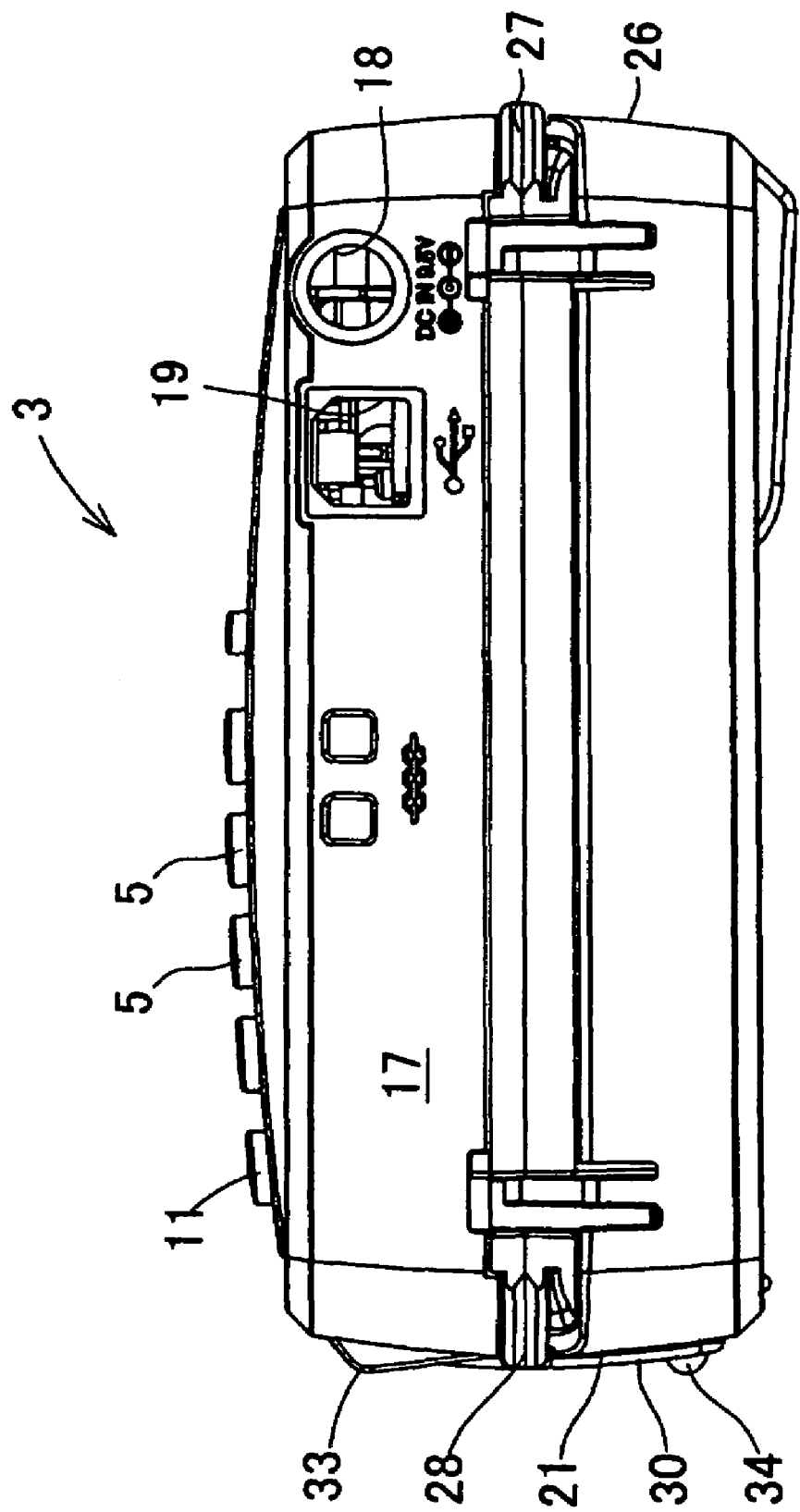
FIG. 4 is a right side representation of the tape printing apparatus which constitutes the charging system of the embodiment.

As shown in FIG. 1, the charging system 1 of this embodiment comprises a tape printing apparatus charger 2 and a tape printing apparatus 3 for charging a secondary battery incorporated therein when the tape printing apparatus 3 is mounted on the tape printing apparatus charger 2. The tape printing apparatus charger 2 is provided with a power adaptor, which will be described later, and supplied with electric power from a commercial power supply through this power adaptor to charge the secondary battery in the tape printing apparatus 3.

Because a section outside of the key input unit and the display unit are inserted into the tape printing apparatus charger with the second side face section of the tape printing apparatus facing downward, the tape printing apparatus can be recharged when the tape printing apparatus is inserted in a fitting section of the tape printing apparatus charger. Thus, charging is enabled even in a narrow space on a desk, thereby saving installation space for charging.

Further, because the key input unit and the display unit are exposed above the tape printing apparatus charger, key input, editing, and the like, are enabled when the tape printing apparatus is inserted in the tape printing apparatus charger. Still further, because the tape discharge slot is provided in the first side face section perpendicular to the second side face section, tape printing is enabled when the tape printing apparatus is mounted on the tape printing apparatus charger. Because the tape printing apparatus is mounted by inserting a section that is inside a predetermined distance from each side of the top face section and outside of the key input unit and display unit, the vertical width of the section to be inserted into the tape printing apparatus charger decreases. Thus, the tape printing apparatus can be set to the tape printing apparatus charger smoothly from a free angle, such as from an obliquely upward, forward direction. Further, when mounting or removing the tape printing apparatus on/from the tape printing apparatus charger, the tape printing apparatus can be mounted or removed on/from the tape printing apparatus charger easily by gripping its top face section and bottom face section with a single hand.

As shown in FIGS. 2 to 6, on a top face section 4 of the tape printing apparatus 3, which has a substantially thin, box shape, are disposed character input keys 5 for inputting text, a print key 6 for instructing on print of a text, a space key 7 for converting input characters from one language to another or other letters or inputting a space, a return key 8 for line feed instruction, executing and selecting of various kinds of processes, cursor keys 11 for moving a cursor vertically and horizontally on a display 10 which indicates characters, such as letters with several rows and the like, such that they are disposed inside of a predetermined distance from each side of the top face section 4. The top face section 4 is disposed outside the tape printing apparatus charger 2 when the tape printing apparatus 3 is loaded on the tape printing apparatus charger 2 as shown in FIG. 1. The left side face section 13 of the tape printing apparatus 3 has a tape discharge slot 14 for discharging a printed tape. The right side face section 17 of the tape printing apparatus 3 has an adapter connector 18 on which a power adaptor (not shown) is attached, a connector 19 to which a USB cable for connecting with a personal computer (not shown) is attached and so-on. Therefore, when the tape printing apparatus 3 is placed on a desk with its top face section 4 upward, the tape printing apparatus 3 can print a tape with the power adaptor inserted into the adapter connector 18 or using the incorporated secondary battery without inserting the power adaptor.

A negative electrode side charging power receiving terminal 23, substantially square as seen from the front, is provided at the center position in the thickness direction (vertical direction in FIG. 5) and in the center in the length direction (right and left direction in FIG. 5) of the front side face section 21 of the tape printing apparatus 3. Positive electrode side charging power receiving terminals 24, which have a laterally long rectangular shape as seen from the front, are provided at symmetrical positions with respect to the center line in the length direction (right and left direction in FIG. 5) outside of the negative charging power receiving terminal 23 in the thickness direction (vertical direction in FIG. 5).

A rib 27, which is substantially semi-circular in terms of its side section, is formed from the deep side of the tape discharge slot 14 of the left side face section 13 to the right side face section 17 through the deep side face section 26 at a central position in the thickness direction (vertical direction in FIGS. 3 to 6) of the outer vicinity section of the tape printing apparatus 3 and both the right and left corners are formed substantially circularly as seen from the top. A rib 28, which is substantially semi-circular in terms of its side section, is formed on the corner sections from the front side section of the right side face section 17 to the right side section of the front side face section 21 such that it is formed semi-circularly as seen from the top and erected outwardly. A rib 29, which is substantially semi-circular in terms of its side section, is formed from a section slightly forward of the tape discharge slot 14 of the left side face section 13 to the left side section in the front side face section 21, such that it is erected outwardly while its corner is formed sub-circularly as seen from the top. The respective ribs 27-29 are provided such that they are erected in substantially the same height from the side face sections 13, 17, 21, 26.

Figure 5:
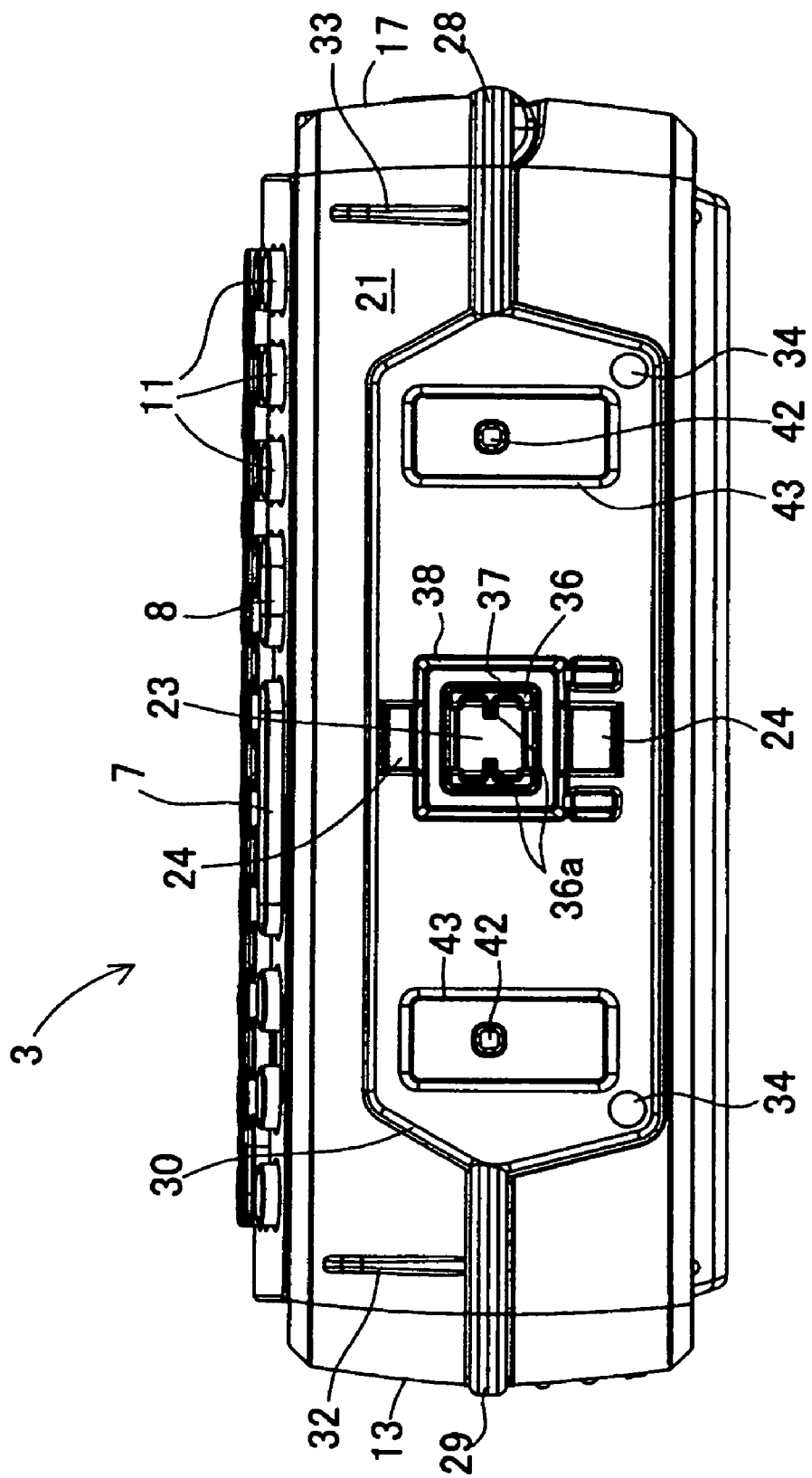
FIG. 5 is a front side representation of the tape printing apparatus which constitutes the charging system of the embodiment.
Figure 6:
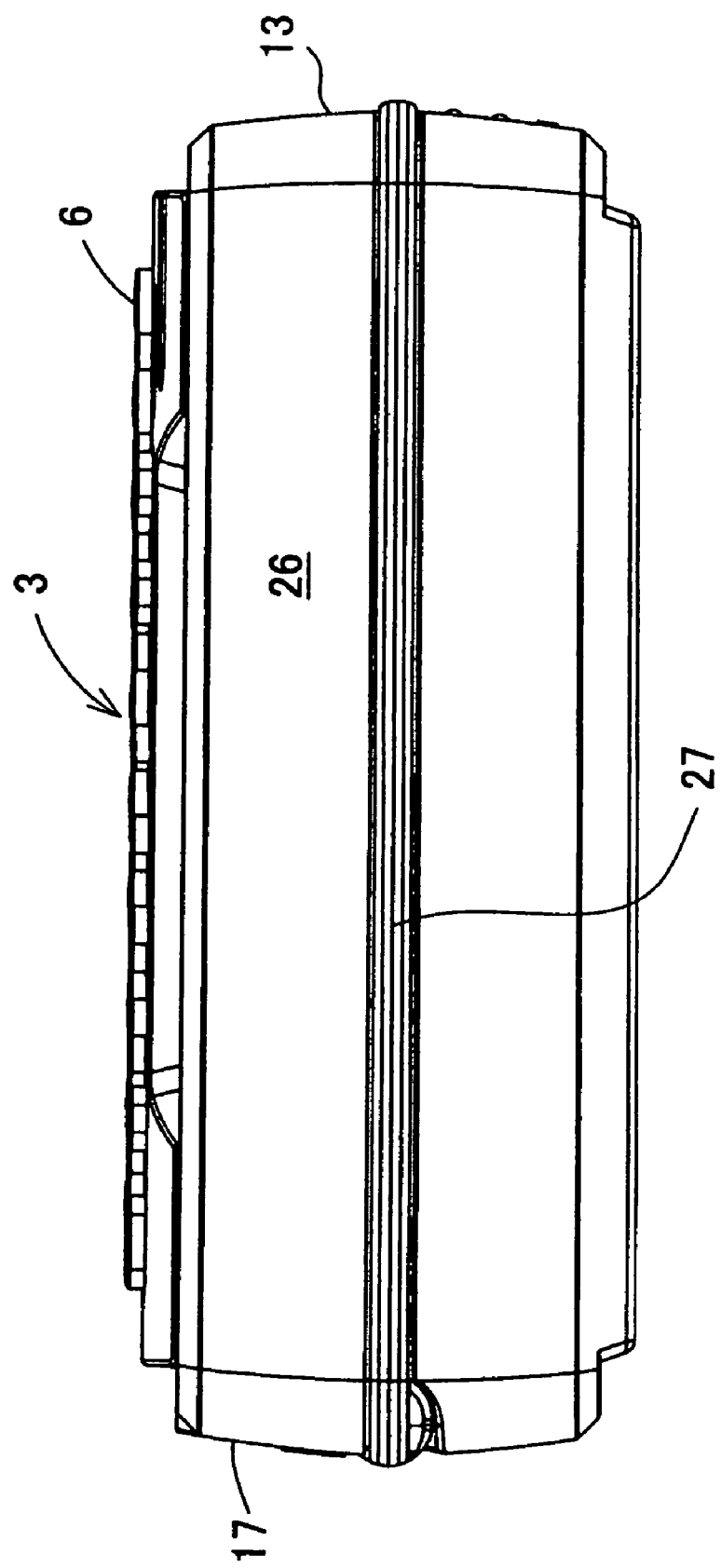
FIG. 6 is a rear side representation of the tape printing apparatus which constitutes the charging system of the embodiment.

As shown in FIG. 5, a rib 30, which is laterally long and rectangular as seen from the front, is provided on the front side face section 21 of the tape printing apparatus 3 such that it is erected surrounding the front side face section 21 between the respective ribs 28 and 29. The rib 30 is formed in a height of their top ends lower than that of the ribs 28, 29. Ribs 32, 33, which are substantially triangular in terms of the side view, are provided in sections above the respective ribs 28, 29 on both right and left sides of the rib 30 such that they are protruded in substantially the same height as the protruding heights of the ribs 28, 29.

Substantially semi-circular protrusions 34 are provided on the right and left corners bottom of the rib 30 laterally long rectangular as seen from the front such that they are protruded in substantially the same height as the protruding height of the ribs 28, 29.

A rib 36, which is substantially square as seen from the front, is provided around the negative electrode side charging power receiving terminal 23 on the front side face section 21 such that they are protruded in substantially the same height as the protruding height of the ribs 28, 29. Extending sections 36A are provided at a position which divides the charging power receiving terminal 23 in the vertical direction on the inside faces of the rib 36 such that they are extended inwardly. A rib 38, which is substantially square in terms of its front view, is protruded in substantially the same height as the protruding height of the ribs 28, 29 so that a groove section 37, which is substantially square in terms of its front view, is formed outside the rib 36.

Substantially cylindrical bosses 42 for pressing a detection switch 77 (see FIG. 8B) of the tape printing apparatus charger 2 are provided in the center in the thickness direction (vertical direction in FIG. 5) at an equal distance from the charging power receiving terminal 23, between the respective ribs 28/29 and the negative electrode side charging power receiving terminal 23 on the front side face section 21 such that they are protruded in substantially the same height as the protruding height of the respective ribs 28, 29. Ribs 43, which are vertically long and rectangular as seen from the front, are provided around the respective bosses 42 such that they are protruded in substantially the same height as the protruding height of the respective ribs 28, 29.

According to another aspect of the invention, there is provided a tape printing apparatus charger comprising a case having a fitting section, in which a tape printing apparatus which has a substantially thin, box shape is fit, and charging power supply terminals provided in the fitting section for charging the tape printing apparatus when the tape printing apparatus is loaded on the fitting section. The fitting section is constituted of a bottom face section having a substantially elongated rectangle shape, on which a predetermined side face section of the tape printing apparatus is to be mounted. The fitting section also has a first supporting section, having a substantially elongated rectangle shape, which is formed of wall sections having a predetermined height from four sides of the bottom face section for supporting a section of the predetermined side face section of the tape printing apparatus. A second supporting section which is extended upward in a predetermined first length from the top edge of a short side of the first supporting section is provided for supporting one side face section perpendicular to the predetermined side face section of the tape printing apparatus. Third supporting sections, which are extended in a predetermined second length from right and left side edges of the second supporting section along the top edge of each long side of the first supporting section, are provided for supporting sections in the vicinity of the second supporting section of a top face section and bottom face section of the tape printing apparatus. The charging power supply terminals are provided at a predetermined position in the bottom face section. The case is formed in the form of a substantially elongated rectangle, as seen in its plan view, of substantially the same size as the first supporting section.

The schematic structure of the tape printing apparatus charger 2 will be described with reference to FIGS. 7A, 7B, 7C, 8A, 8B.

As shown in FIGS. 7A, 7B, 7C, 8A, 8B, the tape printing apparatus charger 2 comprises a lower case 51, which has a substantially elongated rectangle shape as seen from the top while its top face section is open, an upper case 52 which is fit to the top face section of the lower case 51 and in which the tape printing apparatus 3 is mounted on a fitting section 53 having a substantially elongated rectangle shape as seen from the top, and a charging circuit section 54 which is accommodated in a backward section of the lower case 51.

The fitting section 53 in the upper case 52 is constituted of a bottom face section 56, which has a substantially elongated rectangle shape as seen from the top and is substantially the same size as the front side face section 21 of the tape printing apparatus 3. The fitting section 53 has respective side wall sections 57A, 57B, 57C, 57D formed with a predetermined height from four sides of the bottom face section 56 and supporting the outer vicinity section below the space key 7, return key 8, respective cursor keys 11, and the like, of the tape printing apparatus 3 when the tape printing apparatus 3 is loaded with its front side face section 21 facing downward. The side wall section 57A on the front side is formed such that it is inclined at a predetermined angle outward (about 20 to 30 degrees with respect to a vertical direction, preferably about 25 degrees according to this embodiment) as shown in FIG. 8B.

Figure 7A:
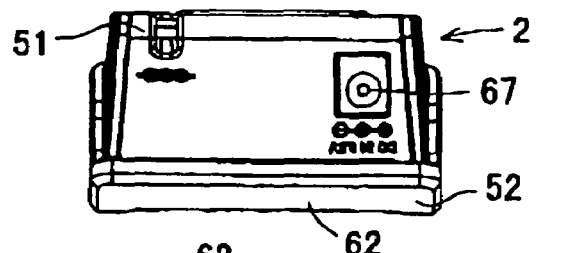
FIG. 7A is a rear view showing the structure of the tape printing apparatus charger which constitutes the charging system of the embodiment.
Figure 7B:
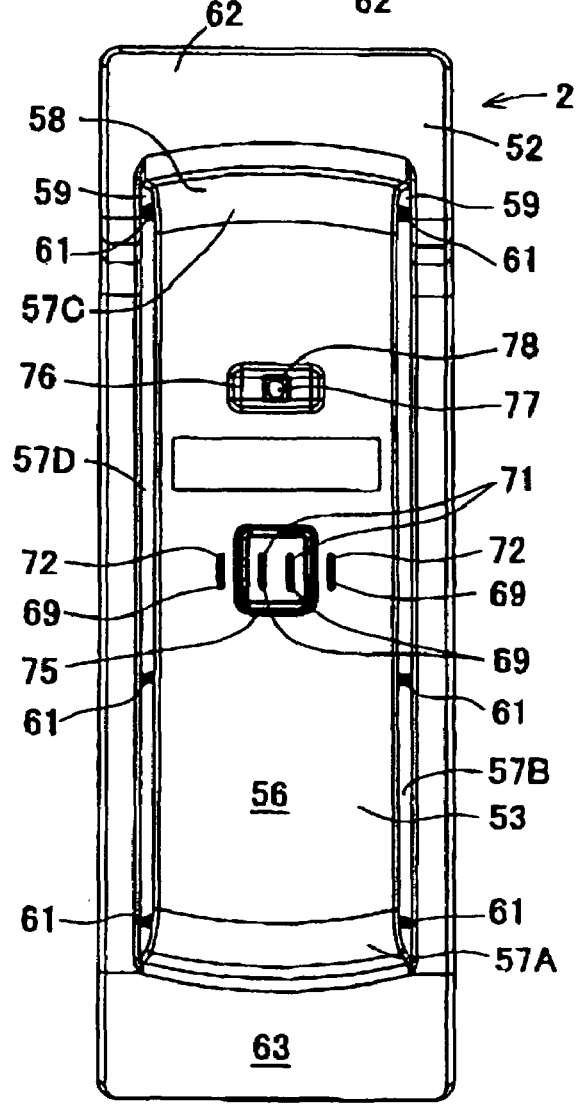
FIG. 7B is a plan view showing the structure of the tape printing apparatus charger which constitutes the charging system of the embodiment.
Figure 7C:
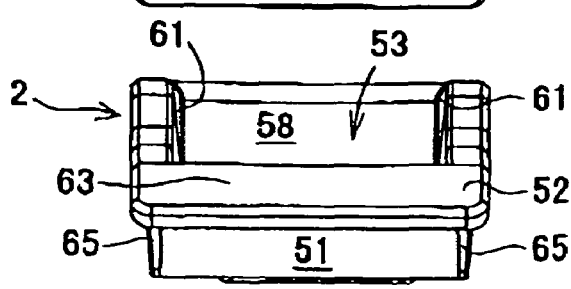
FIG. 7C is a front view showing the structure of the tape printing apparatus charger which constitutes the charging system of the embodiment.
Figure 9:
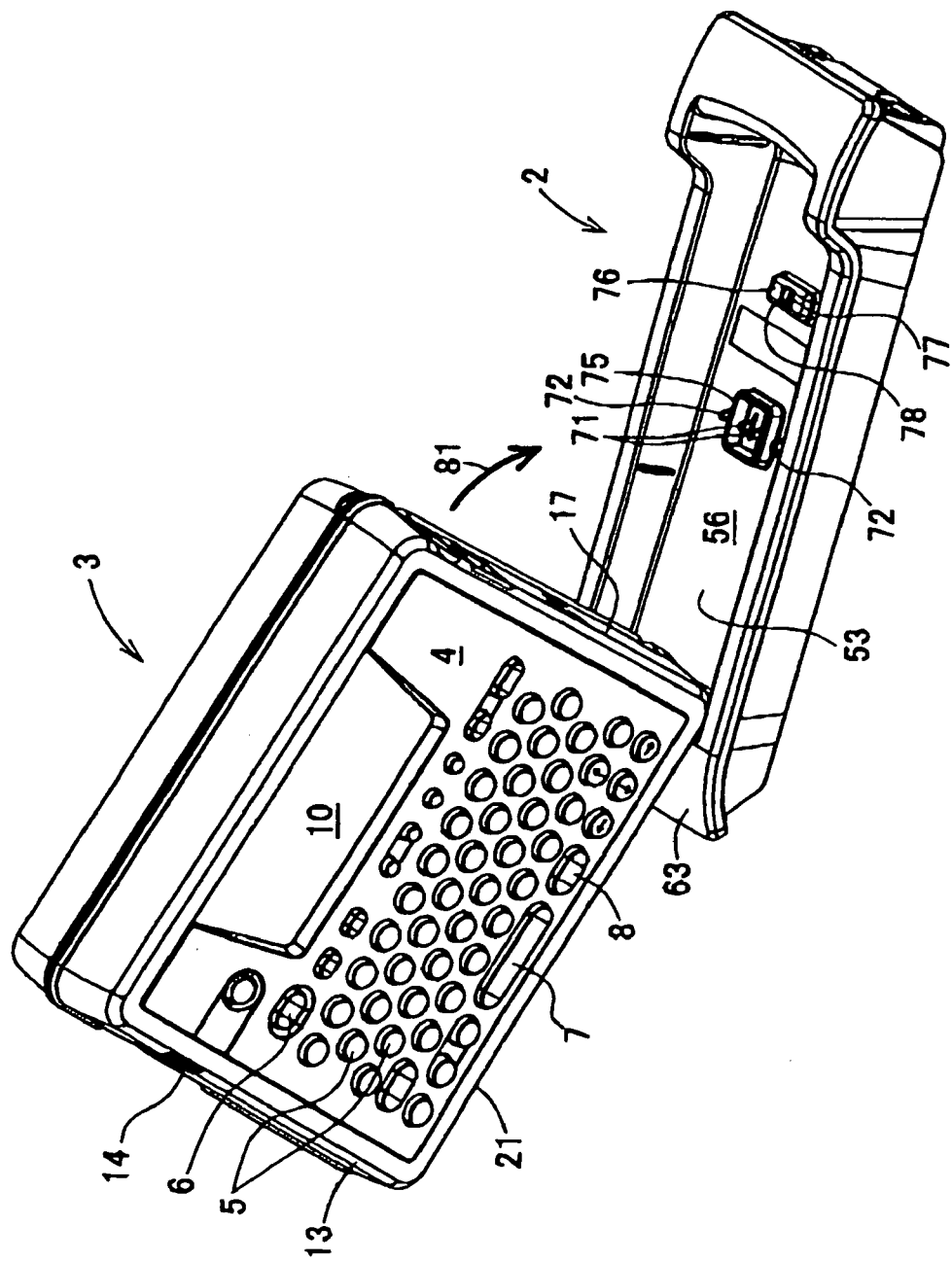
FIG. 9 is a perspective view showing an example of mounting the tape printing apparatus into the tape printing apparatus charger, in which the front edge on the front side face section of the tape printing apparatus is placed on the fitting section of the tape printing apparatus charger from obliquely upward of the tape printing apparatus charger.

An extending section 58, which has substantially the same height as the side wall section 57C and is extended upward, is formed on a top edge section of the side wall section 57C on the deep side (upper in FIG. 7B). Extending sections 59, which are extended along the top edge of each of the right and left side wall sections 57B, 57D from the right and left side edge sections of the extending section 58, are provided to support the top face section 4 located outward of the cursor key 11 of the printing apparatus 3 and the like, and the bottom face section opposing the top face section 4 when the tape printing apparatus 3 is loaded with its front side face section 21 facing downward.

A guide rib 61, which makes contact with the top face section 4 and the bottom face section 56 of the tape printing apparatus 3 when the tape printing apparatus 3 is loaded in the fitting section 53, is provided on each extending section 59 of each of the right and left side wall sections 57B, 57D such that guide rib 61 is erected inwardly. A cover section 62 for covering the lower case 51 is formed on the top edge section of each of the right and left side wall sections 57B, 57D and the extending sections 58, 59 such that the cover section 62 is extended substantially at a right angle in an outward direction. Further, a tilted guide section 63 is extended outward such that it is tilted downward from the top edge section of the front side wall section 57A, (see FIG. 8A) so that the tilted guide section 63 covers the top face section of the tilted supporting section 64 which is extended outward such that tilted supporting section 64 is tilted downward from the top edge section of the front side face section of the lower case 51.

A rib 65 is formed such that the rib 65 is extended forward along both of the right and the left side edge of the tilted supporting section 64 from the both of the right and the left side edge sections of the front side face section of the lower case 51 so as to increase the bending strength of the tilted supporting section 64.

An adapter connector 67 which a power adaptor is to be attached to, is provided on the rear side face section of the lower case 51 and connected to the charging circuit 54.

Four open holes 69 are made symmetrically along the width direction (right and left direction in FIG. 7B) in the center in the length direction (vertical direction in FIG. 7B) of the bottom face section 56 of the fitting section 53 in the upper case 52. Two negative electrode side charging power supply terminals 71, which are connected to the charging circuit section 54, are protruded through the two open holes 69 located in the center, which oppose the charging power receiving terminals 23 of the tape printing apparatus 3, such that they are protruded from the bottom face. Two positive electrode side charging power supply terminals 72, which are to be connected to the charging circuit section 54, are protruded through the two open holes 69 located outside, which oppose the charging power receiving terminals 24 of the tape printing apparatus 3, such that they are protruded from the bottom face section 56. The charging power supply terminals 71, 72 are formed of a coil spring 73. An end section thereof functions as a torsion coil spring as shown in FIG. 8B and the other end of this coil spring is fixed to the bottom face section 56 to urge each of the charging power supply terminals 71, 72 upward.

A protective rib 75, having a substantially square shape as seen in terms of top view, which is to be inserted into the groove section 37 formed in the central section of the front side face section 21 of the tape printing apparatus 3, is provided around the negative electrode side charging power supply terminal 71 such that it is erected higher than the protruding height of each charging power supply terminal 71, so as to isolate from the charging power supply terminal 72.

A laterally long rectangular protruded section 76, which is long in the width direction as seen in plan view and to be engaged in the rib 43 formed in the front side face section 21 of the tape printing apparatus 3, is provided at the central position in the length direction (vertical direction in FIG. 7B) defined by the charging power supply terminal 71 and side wall section 57C on the deep side and in the center in the width direction (right and left direction in FIG. 7B) such that it is protruded up to substantially the same height as the height of the protective rib 75. Further, a through hole 78 is made at the central position of this protruded section 76 so that the boss 42 erected from the front side face section 21 of the tape printing apparatus 3 is capable of being inserted into the same through hole 78. The detecting switch 77 is installed on the bottom face section through this through hole 78 and when the detecting switch 77 is pressed by the boss 42 provided on the front side face section 21 of the tape printing apparatus 3, the charging circuit section 54 is driven.

Next, an example of loading the tape printing apparatus 3, having the above described structure onto the tape printing apparatus charger 2, will be described with reference to FIGS. 9 to 13. A power adaptor (not shown) is connected to the adapter connector 67 in the tape printing apparatus charger 2 and the charger is placed on a desk (for example, a narrow gap between a personal computer and a book) with the tilted guide section 63 located forward.

First, with the front side face section 21 of the tape printing apparatus 3 in a downward position, the top face section 4 and bottom face section of the tape printing apparatus 3 are carried with the hand such that its right side face section 17 is located in the forward direction and then, the bottom edge of the right side face section 17 of the tape printing apparatus 3 is engaged with a forward section (in the direction of an arrow 81) of the fitting section 53 from obliquely upward of the front section of the tape printing apparatus charger 2.

Figure 10:
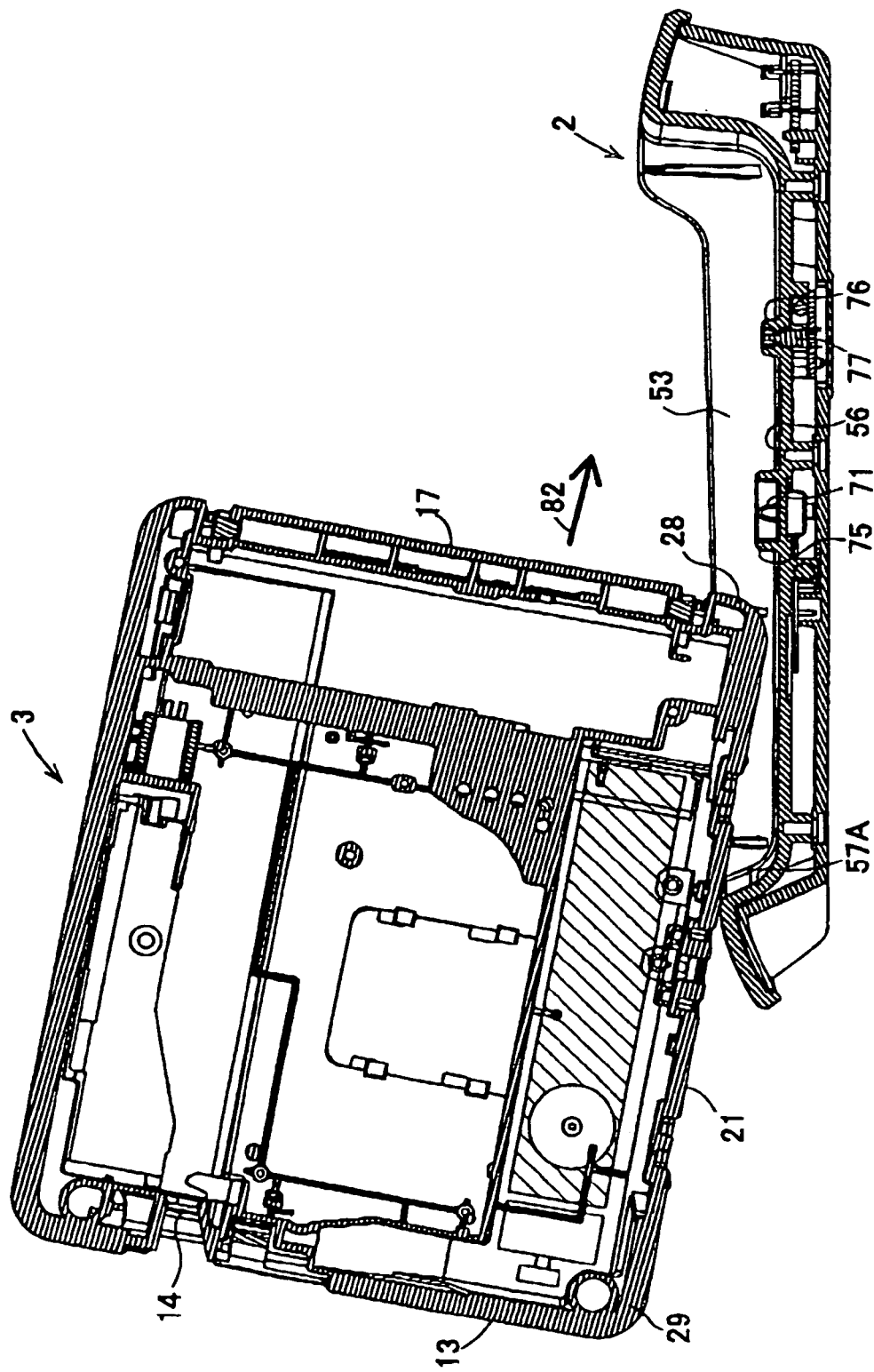
FIG. 10 is a side sectional view showing an example of mounting the tape printing apparatus into the tape printing apparatus charger, in which the front side face section of the tape printing apparatus is kept into contact with the top edge of the fitting section of the tape printing apparatus charger and inserted further to the deep side.

Then, as shown in FIG. 10, the front side face section 21 of the tape printing apparatus 3 is brought into a contact with the top edge of the side wall section 57A on the front side of the fitting section 53 in the tape printing apparatus charger 2 and with the rib 28 formed on the bottom edge section of the right side face section 17 of the tape printing apparatus 3 kept in contact with the bottom face section 56 of the fitting section 53, this tape printing apparatus 3 is inserted in the direction of the front side (direction of an arrow 82).

Figure 11:
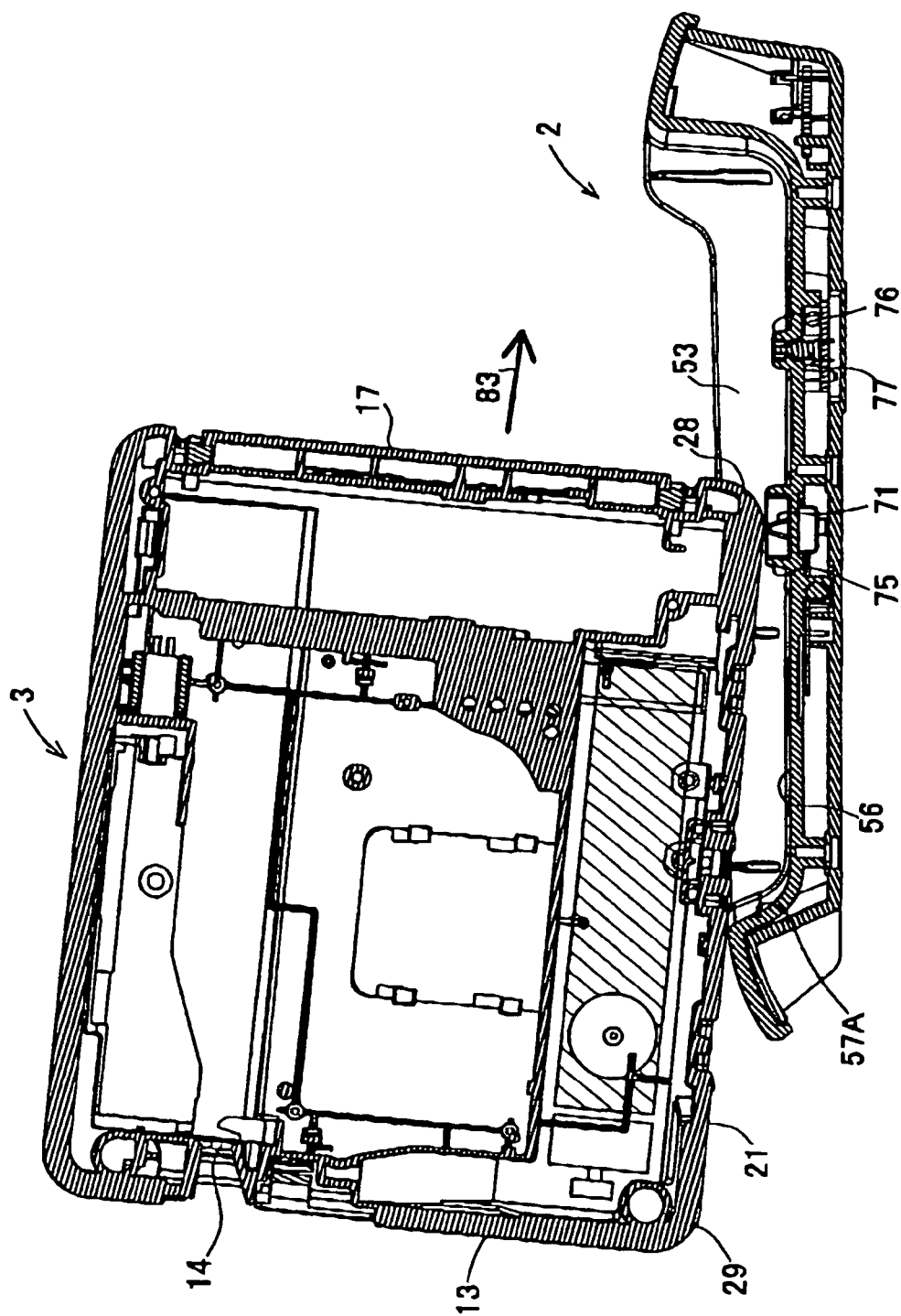
FIG. 11 is a side sectional view showing an example of mounting the tape printing apparatus into the tape printing apparatus charger, in which the tape printing apparatus is inserted to the deep side so that the rib section on the front side face section of the tape printing apparatus rides on the protective rib section erected from the bottom face section of the tape printing apparatus charger.

As shown in FIG. 11, the tape printing apparatus 3 is inserted in the direction of the front side (direction of an arrow 83) with the front side face section 21 of the tape printing apparatus 3 kept in contact with the top edge section of the side wall section 57A on the front side of the fitting section 53 in the tape printing apparatus 3. Consequently, the rib 28 formed on the bottom edge section of the right side face section 17 of the tape printing apparatus 3 rides on the protective rib 75 erected on the bottom face section 56 of the fitting section 53. As a result, the front side face section 21 of the tape printing apparatus 3 is blocked from being in a direct contact with the charging power supply terminals 71, 72.

Figure 12:
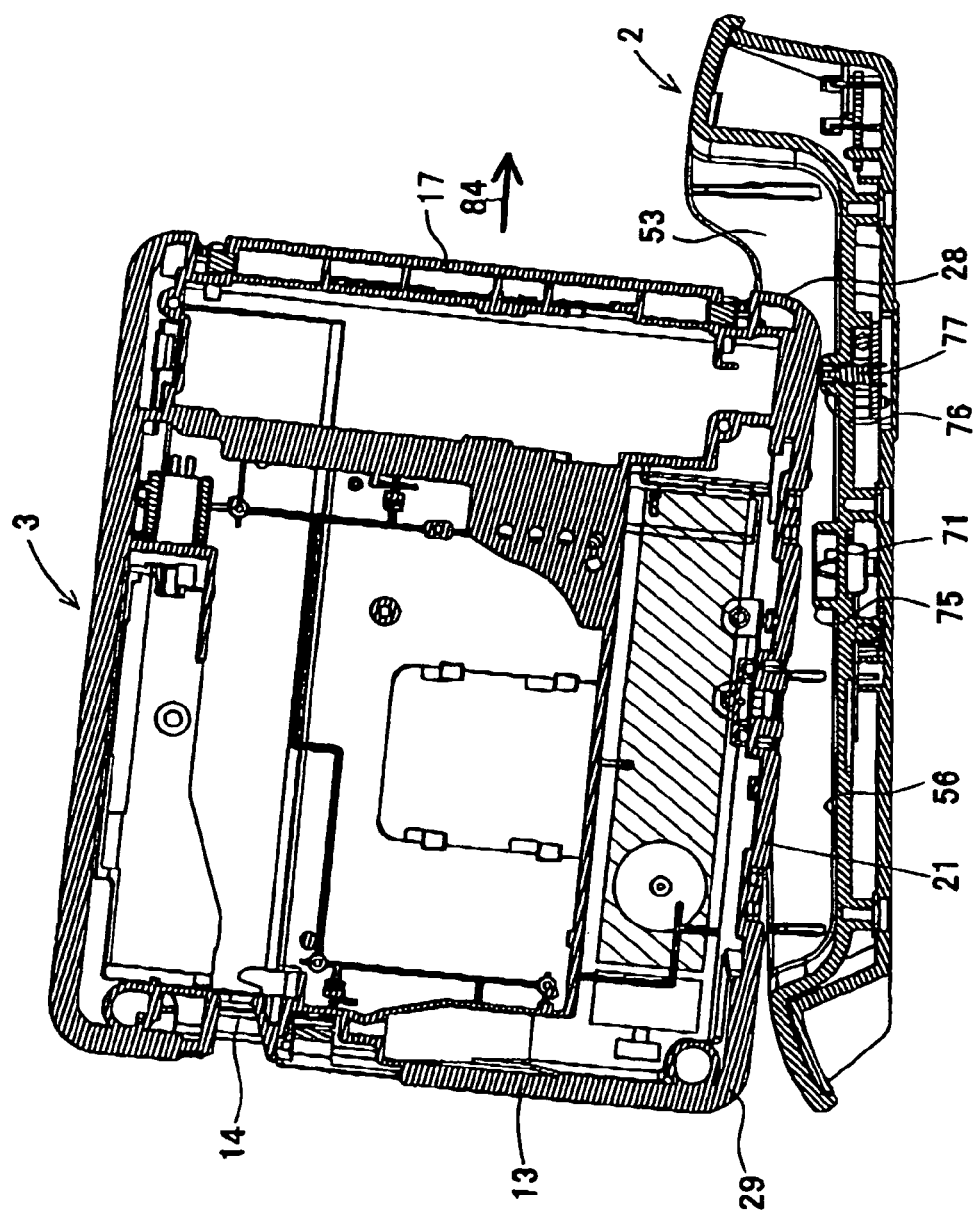
FIG. 12 is a side sectional view showing an example of mounting the tape printing apparatus into the tape printing apparatus charger, in which the tape printing apparatus is inserted to the deep side so that the rib section on the front side face section of the tape printing apparatus rides on the protruded section erected from the bottom face section of the tape printing apparatus charger.

Subsequently, as shown in FIG. 12, the tape printing apparatus 3 is inserted in the direction of the front side (direction of the arrow 84) with the front side face section 21 of the tape printing apparatus 3 kept in contact with the top edge section of the side wall section 57A on the front side of the fitting section 53 of the tape printing apparatus charger 2. Consequently, the rib 28 formed on the front edge section of the front side face section 21 of the tape printing apparatus 3 rides on the protruded section 76 erected from the bottom face section 56 of the fitting section 53. As a result, the front side face section 21 of the tape printing apparatus 3 is blocked from making a direct contact with the detecting switch 77.

Figure 13:
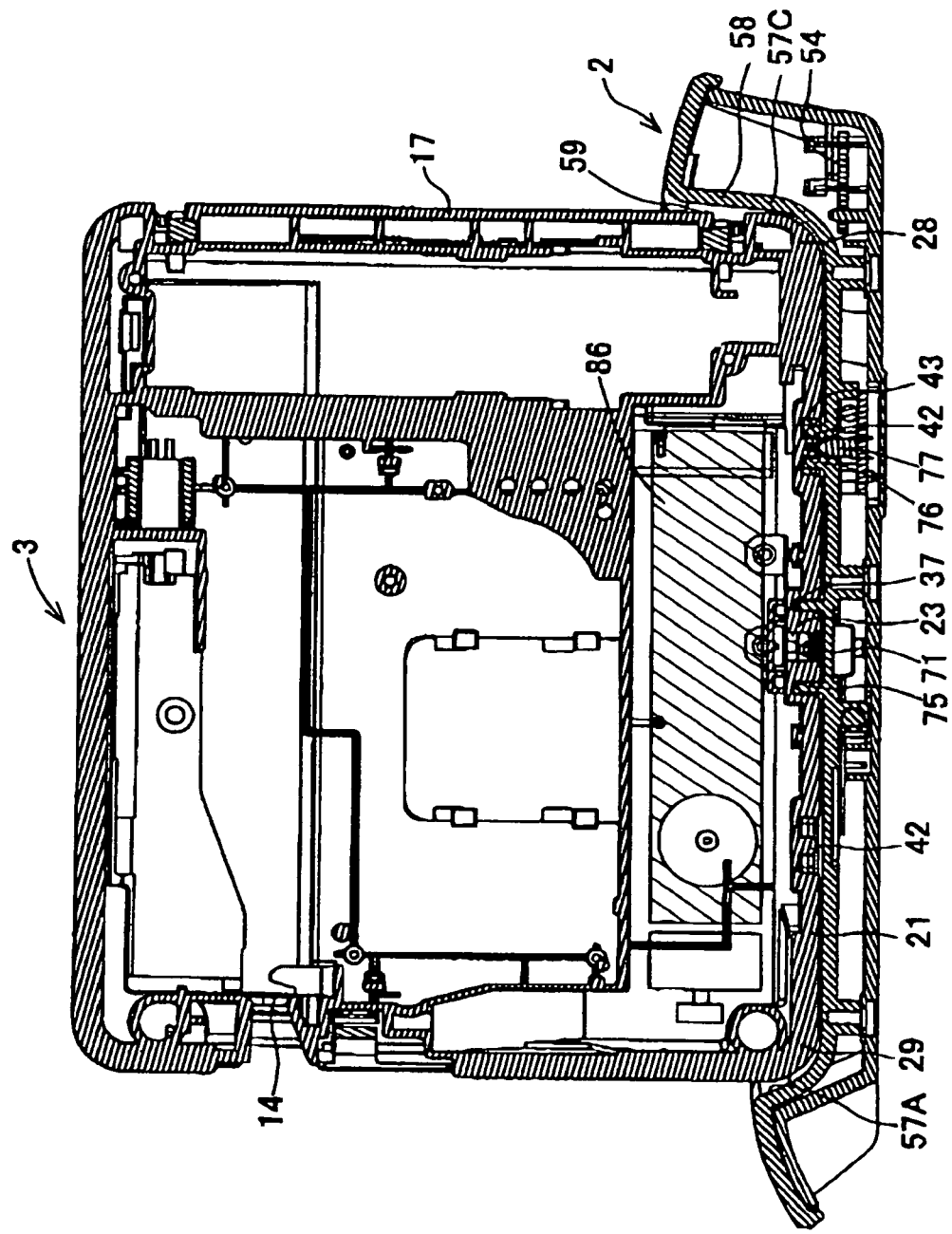
FIG. 13 is a side sectional view showing the tape printing apparatus mounted on the tape printing apparatus charger.

If the tape printing apparatus 3 is inserted further in the direction of the front side as shown in FIG. 13, the front side face section 21 of the tape printing apparatus 3 is mounted on the bottom face section 56 of the fitting section 53 in the tape printing apparatus charger 2. An outer vicinity section below the space key 7, the return key 8 and respective cursor keys 11 and the like of the tape printing apparatus 3, the bottom face section of the right side face section 17, and a section in the vicinity of both side edges on the bottom of the right side face section 17 are supported by the respective side wall sections 57A, 57B, 57C and 57D of the fitting section 53 of the tape printing apparatus charger 2, the extending section 58 and the extending sections 59 (see FIG. 1). Additionally, the charging power receiving terminals 23, 24 provided in the front side face section 21 of the tape printing apparatus 3 make a contact with the charging power supply terminals 71, 72 protruded from the bottom face section 56 of the tape printing apparatus charger 2. The boss 42 on the deep side (right side in FIG. 13) provided on the front side face section 21 of the tape printing apparatus 3 is inserted into the through hole 78 made in the protruded section 76 on the bottom face section 56 of the tape printing apparatus charger 2, so that the detection switch 77 is turned ON to drive the charging circuit section 54. Consequently, the secondary battery accommodated in the tape printing apparatus 3 is charged through the respective charging power supply terminals 71, 72, respective charging power receiving terminals 23, 24 and the power supply substrate 86 connected to the charging power receiving terminals 23, 24.

When the tape printing apparatus 3 is connected to the tape printing apparatus charger 2 as described above, characters, and the like, may be printed on a tape by connecting the tape printing apparatus 3 to a personal computer (not shown) and inputting the characters through the character input key 5. The printed tape is then discharged through the tape discharge slot 14 located on the front side of the tape printing apparatus 3.

Even if the tape printing apparatus 3 is reversed in its direction, the tape printing apparatus 3 can be mounted on the fitting section 53 of the tape printing apparatus charger 2 in the same procedure as indicated in FIGS. 9-13 and recharged because the charging power receiving terminals 23, 24 of the tape printing apparatus 3 are provided at the central position in the length direction (right and left direction in FIG. 13) of the front side face section 21 and the respective bosses 42 are formed at an equal distance from each of the charging power receiving terminals 23, 24 and at the central position in the width direction.

Because of its construction, this tape printing apparatus charger can be easily installed in a narrow or small space on a desk, thereby saving desk space. Further, because the first supporting section of the tape printing apparatus charger is formed to have a predetermined height from four sides of the bottom face section of the fitting section for supporting the section of the predetermined side face section of the tape printing apparatus, the depth of the fitting section can be decreased and the height of the tape printing apparatus charger can be reduced. Consequently, the tape printing apparatus can be set easily to the tape printing apparatus charger from a free angle, such as from an obliquely upward, forward direction, for example. Further, if the tape printing apparatus is loaded from the forward direction with the second supporting section and third supporting section of the tape printing apparatus charger located on the deep side, the side face section on the deep side perpendicular to the predetermined side face section of the tape printing apparatus and the top face section and bottom face section in the vicinity of the side face section on the deep side are supported by the second supporting section and third supporting section of the tape printing apparatus charger. Consequently, the tape printing apparatus is supported stably and can be set to the tape printing apparatus charger from a free angle, such as from an obliquely upward, forward direction. Additionally, because the charging power supply terminals of the tape printing apparatus charger are provided at a predetermined position in the bottom face section of the fitting section, the tape printing apparatus can be mounted securely in the fitting section to ensure complete charging.

Next, another example of loading the tape printing apparatus 3 onto the tape printing apparatus charger 2 will be described with reference to FIGS. 14, 15.

Figure 14:
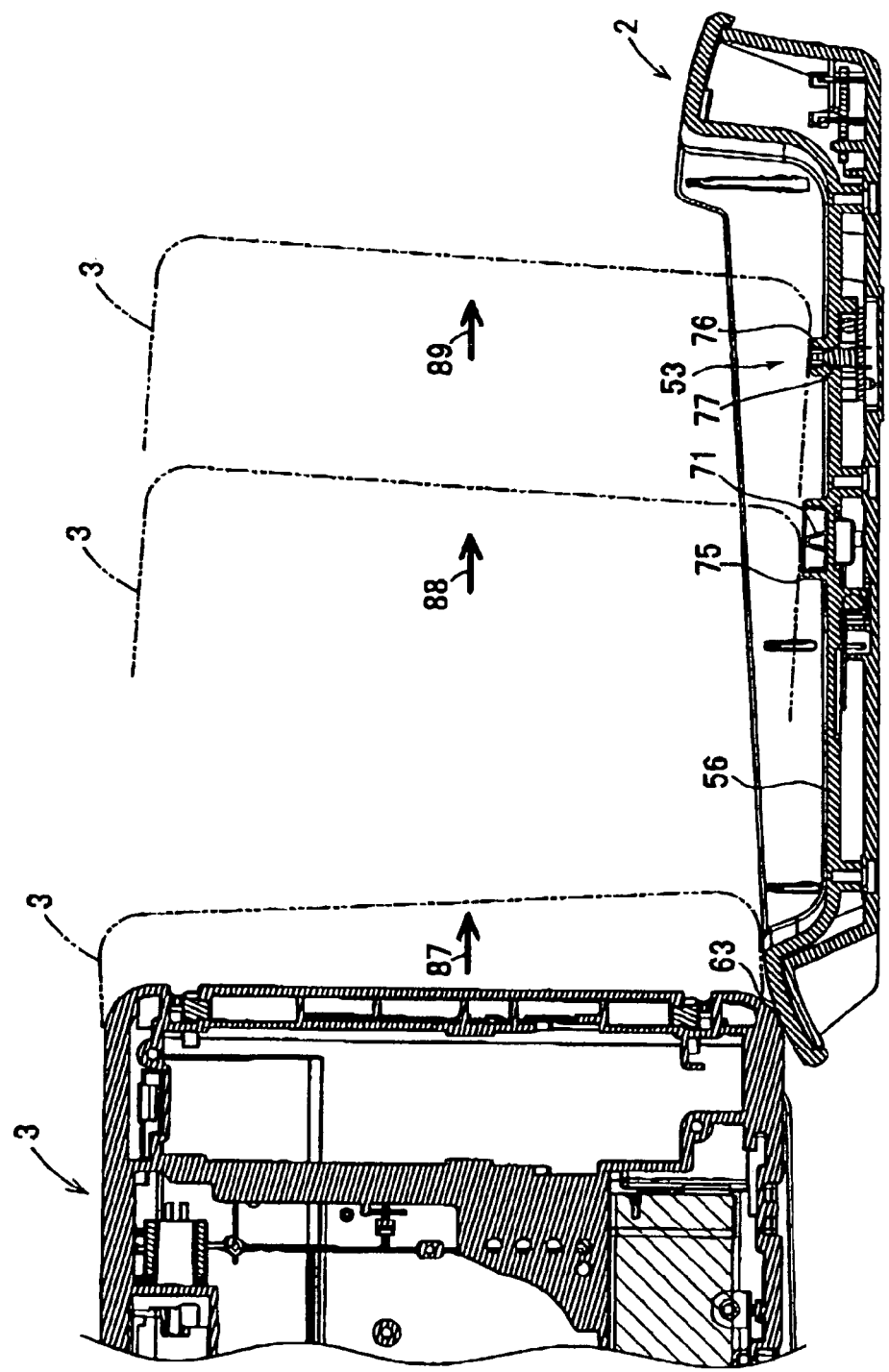
FIG. 14 is a side sectional view showing an example of inserting the same tape printing apparatus to the deep side and mounting, with the rib section on the front side face section of the tape printing apparatus kept in contact with the front edge section of the tilted guide section of the tape printing apparatus charger.

As shown in FIG. 14, with the tape printing apparatus 3 lifted slightly up from a desk top, the rib 28 of the front side face section 21 of the tape printing apparatus 3 is kept in contact with the tilted guide section 63 on the front side of the tape printing apparatus charger 2 and the tape printing apparatus 3 is inserted in the direction to the deep side (directions of arrows 87, 88, 89), the tape printing apparatus 3 can be mounted on the fitting section 53 in the tape printing apparatus charger 2. Further, even if the tape printing apparatus 3 is reversed in its mounting direction, the tape printing apparatus 3 can be mounted on the fitting section 53 of the tape printing apparatus charger 2 in the same procedure as described in FIG. 14 and recharged, because the charging power receiving terminals 23, 24 of the tape printing apparatus 3 are provided at the central position in the length direction (right and left direction in FIG. 14) of the front side face section 21 and the respective bosses 42 are formed at an equal distance in the length direction from the charging power receiving terminals 23, 24 and at the central position in the width direction.

Figure 15:
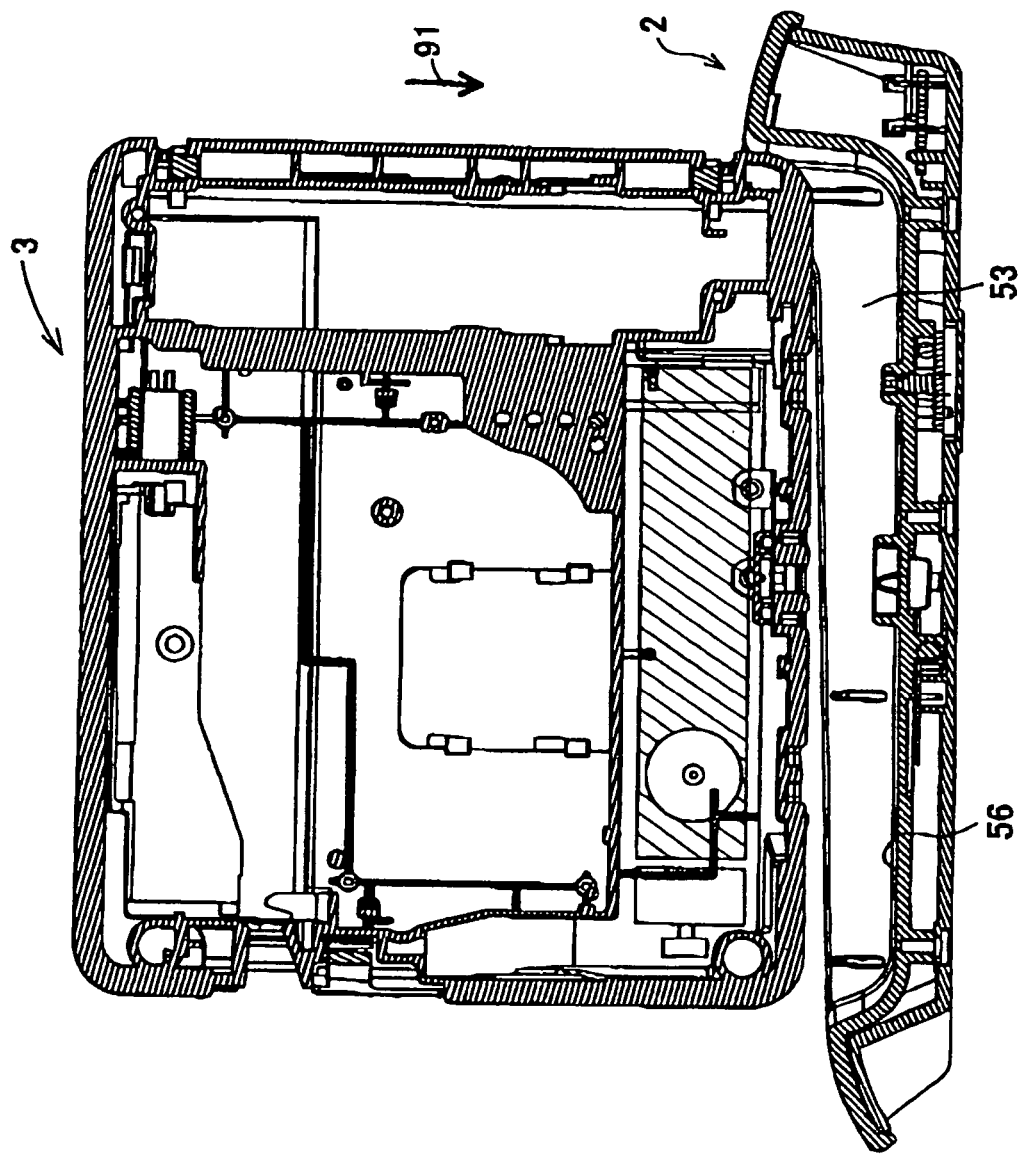
FIG. 15 is a side sectional view showing an example of loading the tape printing apparatus from substantially just above the tape printing apparatus charger.

Further, if as shown in FIG. 15, the tape printing apparatus 3 is engaged downward (direction of an arrow 91) from just above the fitting section 53 of the tape printing apparatus charger 2, the tape printing apparatus 3 can be loaded on the fitting section 53 in the tape printing apparatus charger 2.

In the charging system 1 of this exemplary embodiment, the fitting section 53 of the tape printing apparatus charger 2, is formed in a substantially elongated rectangle configuration as seen from above, which is substantially the same configuration as the front side face section 21 of the tape printing apparatus 3. The tape printing apparatus can be recharged when it is stood on the tape printing apparatus charger 2 with the front side face section 21 of the tape printing apparatus 3, which is substantially thin and box shaped, is in a downward orientation. Thus, the tape printing apparatus 3 can be recharged by installing the tape printing apparatus 3 onto the tape printing apparatus charger 2. Further, because the character input key 5, the print key 6, the space keys 7, the return key 8, the cursor keys 11, and the display 10 of the tape printing apparatus 3 are exposed above the tape printing apparatus charger 2, the tape printing apparatus 3 allows key input, editing functions, and the like, when the tape printing apparatus 3 is stood on the tape printing apparatus charger 2. Further, because the tape discharge slot 14 of the tape printing apparatus 3 is provided in the left side face section 13, the tape printing apparatus is capable of printing on a tape when the tape printing apparatus 3 is loaded on the tape printing apparatus charger 2.

Because the respective side wall sections 57A, 57B, 57C and 57D of the tape printing apparatus charger 2 in the charging system 1 are formed to a predetermined height, so as to support the vicinity section of the front side face section 21 of the tape printing apparatus 3 with four sides of the bottom face section 56 of the fitting section 53, the depth of the fitting section 53 can be reduced and at the same time, the height of the tape printing apparatus charger 2 can be reduced, so that the tape printing apparatus 3 can be loaded easily into the tape printing apparatus charger 2. Further, because the tape printing apparatus 3 can be loaded on the tape printing apparatus charger 2 by inserting a section of the tape printing apparatus 3 within a predetermined distance from each side of the top face section 4 and outside of the character input key 5, the print key 6, the space key 7, the return key 8, and the cursor key 11 into the tape printing apparatus charger 2, the tape printing apparatus 3 can be set smoothly on the tape printing apparatus charger 2 at a free angle such as from obliquely upward, forward direction. When loading or removing the tape printing apparatus 3 on/from the tape printing apparatus charger 2, the tape printing apparatus 3 can be mounted or removed on/from the tape printing apparatus charger 2 easily.

If with the respective extending sections 58, 59 of the tape printing apparatus charger 2 located on the deep side, the tape printing apparatus 3 is loaded from the forward side, the right side face section 17 of the tape printing apparatus 3 and the top face section 4 or the bottom face section 56 of the tape printing apparatus 3 in the vicinity of the right side face section 17 are supported by the respective extending sections 58, 59. Thus, the tape printing apparatus 3 can be supported stably and can be set from a free angle such as obliquely upward, forward direction. Further, because the respective charging power supply terminals 71, 72 of the tape printing apparatus charger 2 are provided at predetermined positions on the bottom face section 56 of the fitting section 53, and the respective charging power receiving terminals 23, 24 of the tape printing apparatus 3 are provided on the front side face section 21, the tape printing apparatus 3 can be recharged securely when it is loaded in the fitting section 53 of the tape printing apparatus charger 2.

If with the left side face section 13 having the tape discharge slot 14 of the tape printing apparatus 3 located forward and the right side face section 17 located on the deep side, the tape printing apparatus 3 is inserted into the tape printing apparatus charger 2 from obliquely upward or from the forward direction, such that the rib 28, makes engaging contact with the tape printing apparatus charger 2 and slides on the tape printing apparatus charger 2 so that it is loaded smoothly. Thus, the tape printing apparatus 3 can be set on the tape printing apparatus charger 2 smoothly at a free angle, such as from obliquely upward, from forward direction, for example.

Further because the respective ribs 33 and protruded sections 34 are provided on a plurality of positions on the front side face section 21 of the tape printing apparatus 3 to ensure the same height as the rib 28, the tape printing apparatus 3 can be stood securely with the front side face section 21 down, thereby improving the stability when the tape printing apparatus 3 is loaded on the tape printing apparatus charger 2.

Because the charging power receiving terminals 23, 24 of the tape printing apparatus 3 are provided along the thickness direction at the central position in the length direction of the front side face section 21 and the charging power supply terminals 71, 72 of the tape printing apparatus charger 2 are provided along the direction of the short side at the central position in the length direction of the bottom face section 56 of the fitting section 53, on which the tape printing apparatus 3 is to be loaded, when the tape printing apparatus 3 is loaded on the tape printing apparatus charger 2 with the front side face section 21 down, the tape printing apparatus 3 can be mounted on the tape printing apparatus charger 2 even if the left side face section 13 and the right side face section 17 of the tape printing apparatus 3 are reversed in the back and forth direction, so that the tape printing apparatus 3 can be loaded on the tape printing apparatus charger 2 smoothly.

Because a section along an outward direction obliquely below the top edge section of the side wall section 57A on the front side of the tape printing apparatus charger 2 is covered with the tilted guide section 63, even if the tape printing apparatus 3 is set substantially horizontally from the forward direction slightly below the top edge section of the side wall section 57A on the front side of the tape printing apparatus charger 2, the bottom face on a deep side of the tape printing apparatus 3 is slid on the tilted guide section 63 and guided up to the top edge section of the side wall section 57A, so that the tape printing apparatus 3 is loaded in the fitting section 53 smoothly. Further, because the tape printing apparatus 3 can be set from slightly below an entrance of the fitting section 53 in the tape printing apparatus charger 2, the tape printing apparatus 3 can be set from a free angle even if the tape printing apparatus charger 2 placed in a small space on a user's desk.

Further, because the detecting switch 77 is disposed on the side of the extending sections 58, 59 with respect to the charging power supply terminals 71, 72 on the bottom face section 56 of the fitting section 53, if the tape printing apparatus is placed on a desk with the extending sections 58, 59 on the deep side and the tape printing apparatus 3 is loaded from the front side, the rib 28 on the deep side of the front side face section 21 of the tape printing apparatus 3 never contacts the detecting switch 77 until it rides over the charging power supply terminals 71, 72, even if it makes contact with the bottom face section 56 of the fitting section 53. Thus, when loading the tape printing apparatus 3 onto the fitting section 53, the apparatus 3 is never caught by anything and can be loaded on the tape printing apparatus charger 2 smoothly. When loading of the tape printing apparatus 3 is detected by the detecting switch 77, the front side face section 21 of the tape printing apparatus 3 rides over the charging power supply terminals 71, 72. Thus, by forming a structure which applies a charging voltage after the detecting switch 77 detects, a short circuit caused by a metal piece, such as clip between the charging power supply terminals 71 and 72 of the tape printing apparatus charger 2, can be avoided.

Further, because the protective rib 75 is provided higher than the protruding height of the charging power supply terminals 71 around the respective charging power supply terminals 71 on a negative electrode side, a short circuit caused by a metal piece, such as clip between the charging power supply terminals 71 and 72, can be avoided. Further, even if the tape printing apparatus 3 is loaded in a position deviated from a horizontal direction, a short circuit by the charging power receiving terminals 23, 24 of the tape printing apparatus 3 can be prevented because the charging power supply terminals 71, 72 on the tape printing apparatus charger 2 are isolated by the protective ribs 75.

The invention is not limited to this exemplary embodiment but needless to say, the present invention may be improved or modified in various ways within a range not departing from the gist of the invention.

What is claimed is:

1. A tape printing apparatus, comprising:
   a top face having at least one of an input device and a display disposed thereon;
   a bottom face opposite the top face; and
   at least one side face having a charging power receiving terminal disposed at a substantially central position in a width direction and a length direction on the at least one side face.

2. tape printing apparatus according to claim 1, further comprising at least one boss projecting outwardly from the at least one side face, wherein the at least one boss activates a switch to allow the tape printing apparatus to be charged.

3. The tape printing apparatus according to claim 1, further comprising a substantially ellipsoid rib that extends outwardly from the at least one side face and a plurality of leg sections disposed on the at least one side face at a plurality of positions, the plurality of leg sections having substantially the height of the substantially ellipsoid rib.

4. A tape printing apparatus charging system, comprising the tape printing apparatus according to claim 1.

5. The tape printing apparatus charging system according to claim 4, the tape printing apparatus further comprising at least one boss projecting outwardly from the at least one side face, wherein the at least one boss activates a switch to allow the tape printing apparatus to be charged.

6. tape printing apparatus charging system according to claim 4, the tape printing apparatus further comprising a substantially ellipsoid rib that extends outwardly from the at least one side face and a plurality of leg sections disposed on the at least one side face at a plurality of positions, the plurality of leg sections having substantially the height of the substantially ellipsoid rib.

7. The tape printing apparatus charging system according to claim 4, further comprising:
   a tape printing apparatus charger, comprising:
      a case having side walls and a bottom face section that form a fitting section to receive the tape printing apparatus;
      a charging power supply terminal disposed at a substantially central position on the fitting section to supply charging power to the tape printing apparatus; and
      a tilted guide section that guides the tape printing apparatus into the charger and extends outwardly from a side wall of the charger such that the guide section is tilted downward from a top edge of the side wall.

8. The tape printing apparatus charging system according to claim 7, the tape printing apparatus charger further comprising a detecting switch for detecting that the tape printing apparatus is mounted on the fitting section, wherein the detecting switch is disposed distally from the charging power supply terminals on the bottom face section.

9. The tape printing apparatus charging system according to claim 8, wherein the bottom face section of the tape printing apparatus charger has a protective rib having a height larger than a height of the charging power supply terminal disposed around the charging power supply terminal.

10. The tape printing apparatus charging system according to claim 8, wherein the detecting switch of the tape printing apparatus charger is in a retracted position when the tape printing apparatus is inserted into the tape printing apparatus charger.

* * * * *